SOUND RECORDING METHOD AND APPARATUS

Filed Jan. 25, 1963 3 Sheets-Sheet 1

INVENTOR.
BENJAMIN B. BAUER
BY
Brumbaugh, Free, Graves & Donohue
his ATTORNEYS

INVENTOR.
BENJAMIN B. BAUER
BY
Brumbaugh, Free, Graves & Donohue
his ATTORNEYS

INVENTOR.
BENJAMIN B. BAUER

BY

Brumbaugh, Free, Graves & Donohue his ATTORNEYS

United States Patent Office 3,490,771

Patented Jan. 20, 1970

3,490,771
SOUND RECORDING METHOD AND APPARATUS

Benjamin B. Bauer, Stamford, Conn., assignor to Columbia Broadcasting System, Inc., New York, N.Y., a corporation of New York Filed Jan. 25, 1963, Ser. No. 253,821
Int. Cl. G11b *3/44*
U.S. Cl. 274—46 14 Claims

ABSTRACT OF THE DISCLOSURE

Disc record cutting techniques and apparatus are described for reducing distortion resulting from undesired variances between the modulation slant angle established by the cutter and the vertical tracking angle of the playback stylus. The cutting stylus is mounted with a vertical recording angle to the surface of the record blank that is greater than the desired modulation slant angle by an amount compensating for the amount of springback exhibited by the record material and cutting apparatus. Upon completion of the cutting, the modulation slant angle is at the value for proper playback. Various cutter stylus mounting arrangements are described.

The present invention relates to sound recording techniques, and more particularly to methods and apparatus for reducing distortion resulting from undesired variances between the modulation slant angle established by the record cutting apparatus, and the vertical tracking angle of the stylus at the pickup of the playback equipment. The invention also encompasses methods of measuring the modulation slant and vertical tracking angles, to enable the proper application of the distortion reducing methods and apparatus.

Stereophonic disc recording techniques generally embody both lateral and vertical motion of the cutting stylus to record the sum and difference signals, respectively, necessary to create the stereophonic effect. The principal information content resides in the lateral mode, or sum, modulation, while the directional information is contained in the difference signal which is recorded in the vertical mode. Most monophonic systems in use today use the lateral motion of the stylus for recording, although some recording is done in the vertical mode.

Vertical mode recording, whether monophonic or of the difference stereo component, presents a problem arising out of the positioning of the recording and playback styli with respect to the record surface. In both cases, the styli are mounted above the record and moved in accordance with the signal or groove variations in a generally vertical plane. However, because of the elevated mounting of the styli, the plane of motion is actually inclined away from the vertical, at an angle determined by the geometry of the apparatus. These angles, termed the vertical recording angle in the case of the recording stylus, and the vertical tracking angle in the case of the reproducing stylus, are recognized in the art, and record cutting and playback equipment have values assigned in accordance with various design procedures.

When recording in a vertical mode, the vertical recording angle of the cutting stylus produces in the undulations in the record groove what is termed a "mudulation slant." In effect, the recording angle of the cutting stylus serves to lean, or slant, the vertical modulation at an angle to the true vertical, which angle is termed the modulation slant angle. As will be apparent, in order to reproduce the vertical modulation in the groove with fidelity, the vertical tracking angle of the playback stylus should be made equal, as nearly as possible, to the modulation slant angle.

Heretofore, it had been assumed that a cutting stylus having a given vertical recording angle would produce a modulation slant in the record of the same angle. Since different manufacturers of record cutting equipment provided different vertical recording angles, playback styli were designed at angles that were compromises, enabling reasonably good reproduction for a range of recording angles. Therefore, a certain small amount of distortion was expected. However, careful listening to a replay by playback equipment indicated to have a vertical tracking angle equal to the vertical recording angle of the cutting apparatus, reveals a certain amount of unexpected, and undesirable, vertical mode distortion.

The present inventor has found that this added distortion stems from the effects of the longitudinal elasticity of the material from which record masters are made and the transverse elasticity of the recording styli and stylus mounting means. Thus, as the cutting stylus moves through the record material, in addition to cutting the groove, it compresses or compacts the record material ahead of the cutting tip and causes the stylus to be deflected backwardly to an extent dependent upon the depth of the cut, or in other words, the extent of the vertical modulation. With lateral recording, the recording stylus rides at constant depth and the springback is constant; therefore no distortion results. With vertical recording mode the amount of deflection and compacting and the subsequent springback vary with the modulation, with resultant distortion of the wave. As the compressed portion moves behind the cutter, it springs back to its original configuration. The springback effect thereby introduces an angular deviation of the modulation slant which effectively subtracts from the expected angle determined by the recording angle of the cutter.

Accordingly, it is the principal object of the present invention to provide improved methods and apparatus for reducing vertical mode distortion in sound recording.

Another object of the present invention is to provide improved methods and apparatus for reducing distortion introduced in sound recording by the springback effect presented by the material of the record master, and/or by the transverse elasticity of the recording stylus and its mounting.

A further object of the invention is to provide novel methods of determining the vertical tracking and modulation slant angles useful in determining the extent of the springback.

Briefly, according to the present invention, the distortion due to the springback effect of the record material and cutting apparatus is reduced by introducing compensating effects in the geometry of the cutter mounting. For example, the cutting stylus is arranged to be inclined at an angle to the vertical greater than the desired modulation slant by an amount sufficient to compensate for the springback effect. The added angle may be introduced by insertion of a wedge in the cutter mounting structure. Where the cutter is designed to provide a 0° recording angle, such as is the custom in some European record cutting devices, the geometry of the cutter may be such as to make it difficult to incline the cutter at the proper angle. In that case, an alternative method is to reverse the cutter stylus in its mounting, with the record turntable rotated in a direction opposite to its normal direction, and recording accomplished inside out, to avoid a backwardly leaning modulation which is incompatible with any of the present day pickups.

In another modification, compensation may be introduced in the stylus-holding arm itself by the insertion of a piezoelectric element which expands and contracts in response to the amplitude of the modulating signal. This effectively adds an increment of predistortion to the recorded modulation which then, upon springback of the material, results in the proper modulation slant. In the various modifications, the extent of the compensation may be determined by measurement of the modulation slant angle and the vertical tracking angle of the playback stylus, as hereinafter discussed.

The foregoing and other objects, features and advantages of the present invention will become more readily apparent from the following detailed description thereof when taken in conjunction with the accompanying drawings, in which.

Figure 1:
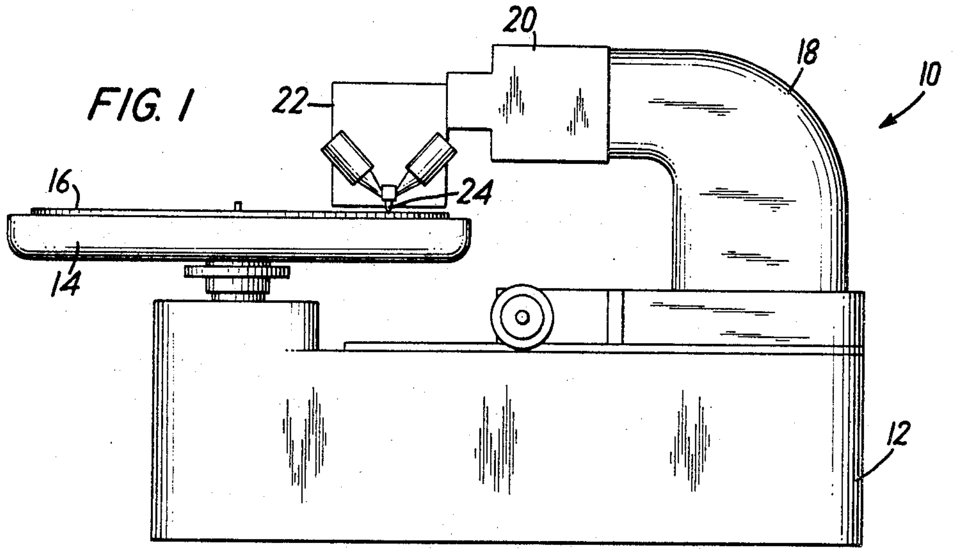
FIGURE 1 is a schematic drawing of a record cutting lathe.

FIGURE 1 illustrates in schematic form a record cutting apparatus of generally conventional type. The base portion 12 includes a motor drive (not shown) for rotating a record turntable 14 which carries the record master 16. A support arm 18 is also mounted on the base 12 and carries at its outer extremity an adjustable positioning member 20. The cutting head 22 is mounted on the positioning member 20 and includes a cutting stylus 24 for cutting the groove in the disc 16. As illustrated, the stylus is driven by a pair of orthogonally related heads for producing a stereophonic recording in known manner. It will be realized that all of the above elements are conventional and the details thereof have been omitted from the drawing.

The master recording disc 16 consists generally of a rigid supporting plate, usually made of aluminum, on one surface of which is provided a layer of acetate plastic. This is what is termed a lacquer disc in the recording industry. If desired, the plastic coating may be put on both sides of the aluminum plate to permit recording on both surfaces.

Figure 2:
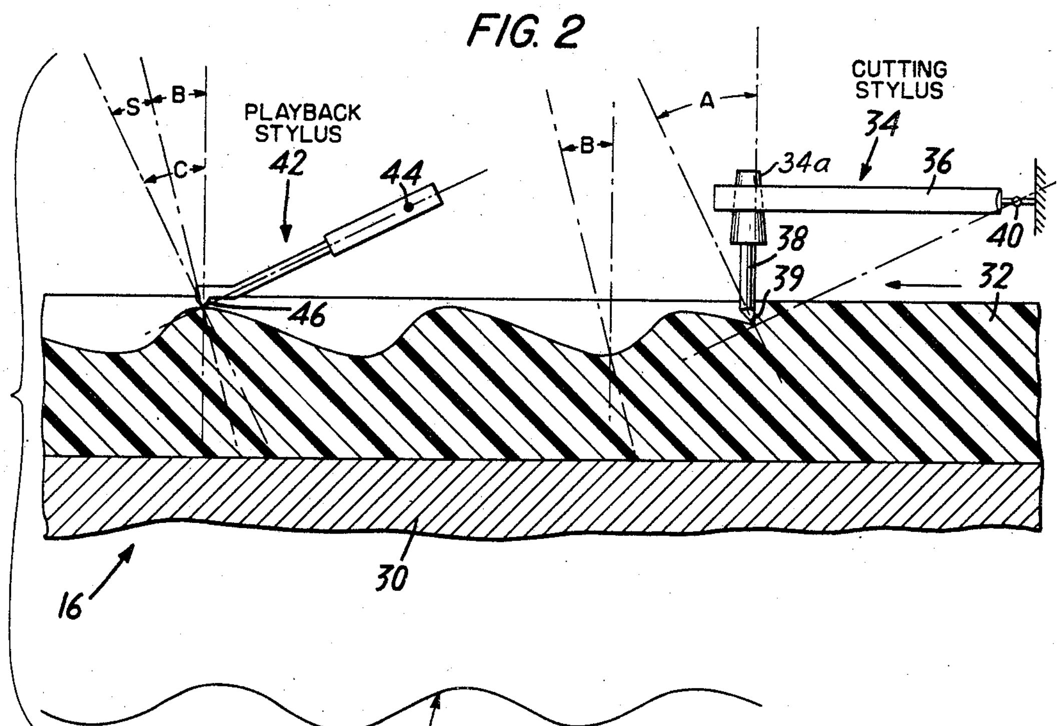
FIGURE 2 is a cross-sectional view taken along the length of a record groove showing the positions of recording and playback styli.

In FIGURE 2 is shown a cross section of a record master taken along the portion of the length of the groove, to illustrate the recording process. As discussed above, the record master comprises, for example, a base disc 30 on top of which is applied a layer 32 of plastic or other suitable recording material. The cutting stylus 34 is usually held in a tapered shank **34*a* and is mounted in a horizontal cutter arm 36 generally parallel to the surface of the record. The cutting tip of the stylus has a cutting face 39 in a generally vertical direction to the surface of the record. The cutter stylus assembly is mounted over the record surface and pivoted with respect thereto at a point 40. The signals to be recorded are applied to the cutting head by means of orthogonal transducers such as moving coils, which are well known to the art, and are not shown. It will be seen therefrom, that as the sine wave signal illustrated is applied to the cutter as vertical mode modulation, the resulting motion of the point of the cutter stylus is not in a vertical plane but is inclined from the vertical at an angle A determined by the position of the pivot 40** with respect to the tip of the stylus. Actually, the movement is over a small arc and may be assumed to be in a straight line.

Heretofore, it has been assumed that the vertical recording angle A of the cutter stylus produced in the groove an actual modulation slant angle B of the same value. However, as will be discussed hereinafter, the springback effect in the record master material and the stylus results in a modulation slant angle less than that predicted.

A pickup stylus 42 is also indicated in FIGURE 2. As in the case of the cutter stylus, the pickup stylus is pivoted in its cartridge mounting at a point 44 above the surface of the record and a vertical tracking angle C is thereby established. Assuming that a recording angle A would provide the same modulation slant angle, as heretofore believed, the tracking angle C would be made equal to the angle A to secure matching. However, the modulation slant actually achieved in the record is indicated by the angle B, which is somewhat less than the recording and predicted tracking angles. This variance between the vertical tracking angle and the modulation slant is indicated by the angle S and gives rise to the distortion mentioned above.

Figures 3A, 3B:
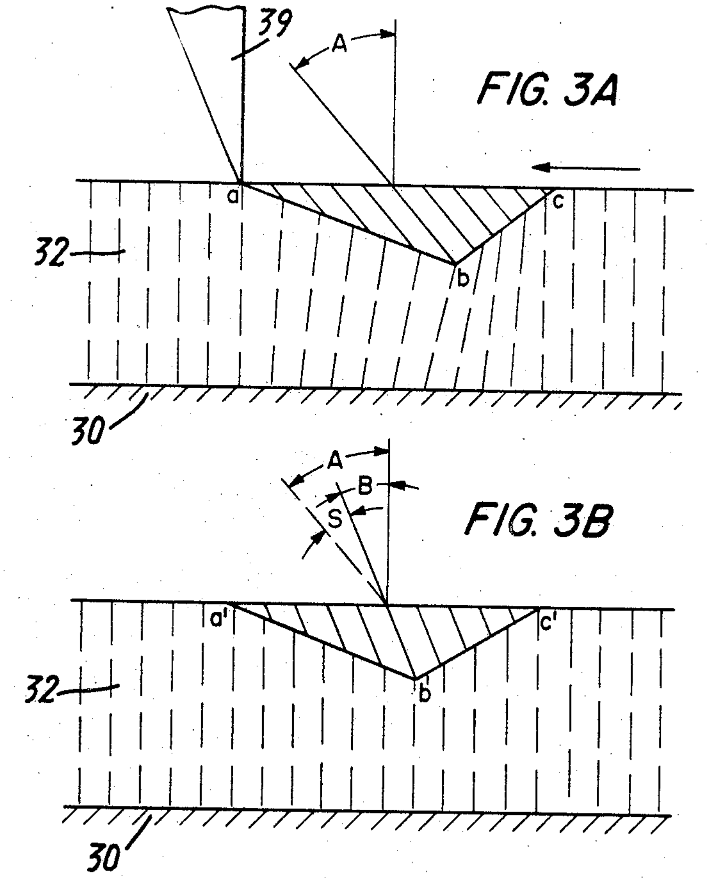
FIGURES 3A and 3B are schematic cross-sectional views along a record groove useful in explaining the invention.

The phenomenon responsible for this discrepancy between the predicted recording angle and the modulation slant may be explained by reference to FIGURES 3A and 3B. In FIGURE 3A a portion of the plastic coating 32 of a record master is illustrated with the point of a cutting stylus 38 about to commence the taking of a triangular cut *abc* in the record surface. The vertical dotted lines traversing the plastic layer 32 are spaced to indicate the relative compression of the plastic material as the stylus 38 moves across the record and make the cut. The geometry of the cutter stylus and its mounting indicates a vertical recording angle A.

As the cutter 38 moves from point *a* and into the record surface, the stresses set up in the material as the cut is made tends to push the material forward as indicated by the slant of the dashed lines. As the cut gets deeper, the slant increases, and at point *b*, the slant is at a maximum. As the cutter emerges at *c*, the stress is reduced to zero again.

At the conclusion of the cut, FIGURE 3B, the material springs back to its original, unstressed position. Because of the compression of the material during the cutting operation, and its subsequent springback, the modulation slant produced in the material is at an angle B, smaller than that heretofore expected with the recording angle A. The magnitude of the springback effect is indicated by the angle S.

The transverse elasticity of the recording stylus and mounting, has a somewhat similar effect, although of lesser magnitude than that exhibited by the record material. As the stylus enters the record surface, the increased stresses tend to push it backwardly with subsequent springback upon emergence from the lacquer. Therefore, the elasticity of the stylus tends to diminish the actual modulation slant compared to the original recording angle A.

It has been found, for example, that the springback angle S in conventional record masters is approximately 20°. Thus, a conventional cutter with a 23° recording angle produces an actual modulation slant in the order of 3°, rather than the 23° value predicted.

Figure 4A:
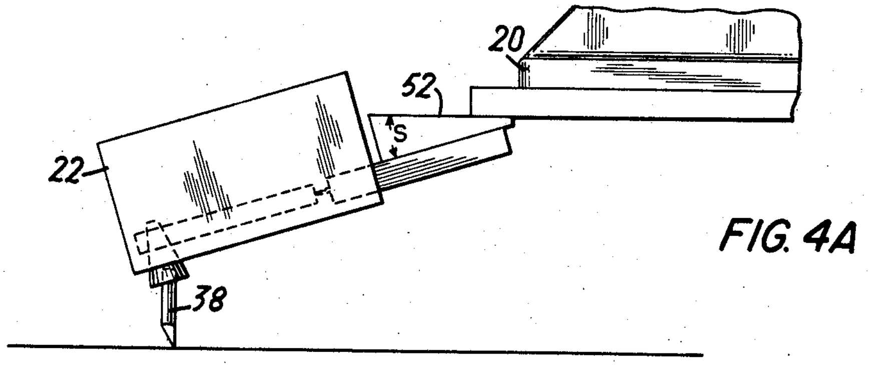
FIGURE 4A is a partial elevation of a record cutting apparatus illustrating one form of apparatus according to the invention.

To compensate for the springback angle S, the arrangement of FIGURE 4A may be used. As shown therein, the recording head 22, which contains the cutter stylus 38 is fastened to the mounting means 20 at an angle determined by the angle of the wedge 52 interposed in the connection therebetween. In the drawing, this wedge is shown to have an angle S equal to the springback angle shown in FIGURE 3B. This angle S of course depends upon the amount of springback in the material of the record master, and also may include a factor for matching the recording angle to the tracking angle in a recording system, where by design, the two angles are not intended to be equal. Thus, for example, the modulation slant prescribed by the Record Industry Association of America (RIAA) is 15°, and a standard record cutter available to the trade is made with a 23° recording angle. Taking into account the springback effect exerted by the material of the record master, it has been found that by inclining the angle of the cutter an additional 14°, such as by means of a wedge 52, the resultant modulation slant achieved is between 15° and 17°.

Figure 4B:
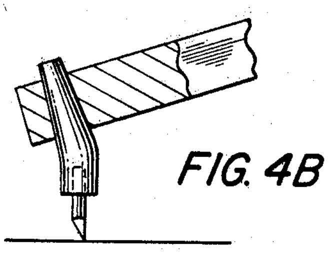
FIGURES 4B and 4C illustrate modified forms of styli usable in the apparatus of FIGURE 4A.
Figure 4C:
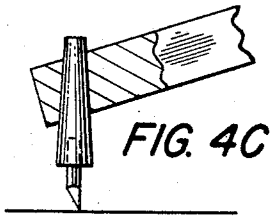

It should be noted that other means for constructing a stylus and stylus mount suitable for carrying out the invention is possible. For example, the stylus shank may be bent at a suitable angle as shown in FIG. 4B, or the stylus mounting bar may be provided with a bore at a proper angle as shown in FIG. 4C.

A variation on this technique arises in the case of vertical recording angles of 0° such as are used in some European apparatus. With such a recording angle, it will be seen that the cutters produce a backwardly leaning modulation. Measurements, of the type to be discussed hereinafter, have indicated that a negative modulation slant of approximately 16° results. Thus, if it is desired to produce a true modulation slant of 15°, in accordance with the RIAA prescription, with the 0° cutters in existence, the cutter may be turned around in its mount and the record and the tape supplying the information to be recorded may be caused to run backwards, at the same time recording on the disc from the inside out. When such records are played in the normal manner, the modulation slant will be approximately equal to the 15° vertical tracking angle of the playback pickup.

Figure 5:
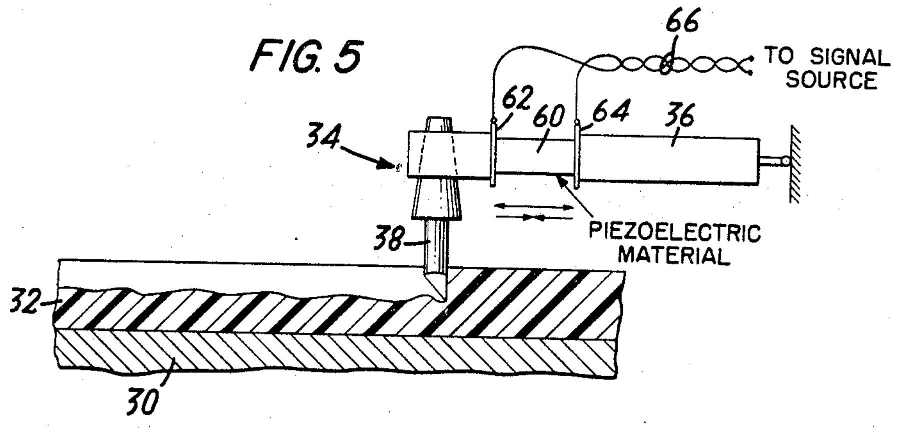
FIGURE 5 is another form of apparatus in accordance with the invention.

An alternative technique for compensating for the springback effect of the record material is illustrated in FIGURE 5. The horizontal cutter arm 36 of the cutter includes as a section thereof, an element 60 of piezoelectric material, e.g. barium titanate. Contact plates 62, 64 are disposed in contact with the respective sides of the element 60 and, if desired, may be made integral with the cutter bar itself. A pair of leads 66 connect the plates to the source of vertical recording signal, whereby the element 60, and consequently the cutter bar 36, elongates and contracts in accordance with the signal amplitude.

As noted by reference to FIGURE 3A, the deeper the cut made by the cutting stylus, the greater the extent of the springback effect. Accordingly, if an increment of the cutting action, of a magnitude related to the depth of cut, is added to that already provided by the rotation of the record, the extent of the cut will vary to compensate for the springback effect. This increment of motion, or cutting action, may be applied by means of the piezoelectric structure shown in FIGURE 5. As will be readily understood, the signals actually applied to the element 60 will be reversed in polarity with respect to the recorded signals, so as to cause the portion 36 to contract during recording of high amplitude signals and elongate again as the amplitude of the signals decreases. It will be understood that in a stereophonic system, only the difference signals are applied in this manner.

From the foregoing, it will be seen that effective compensation for the springback effect requires knowledge of the real values of the three angles involved. The vertical recording angle is dependent upon the geometry of the cutter and its mounting and each of the commercially available cutters is provided with its nominal recording angle indicated. However, this may be altered by the elasticity of the stylus, as described hereinbefore. Similarly, the tracking angle of the playback stylus is designated by the manufacturer. However, it has been found that in playback stylus mountings employing resilient holding members, the resiliency of the member introduces an error that makes the true tracking angle somewhat different from the apparent value. Thus, a method is needed to ascertain and verify the real values of the modulation slant and pickup tracking angles for carrying out the purposes of this invention.

The true tracking angle, as well as the true modulation slant angle, may be accurately determined with the aid of a test record including two or more bands, each having vertical modulation providing a modulation velocity of a different value. This may be achieved by recording at a different amplitude or frequency in each of the respective bands.

Figure 6:
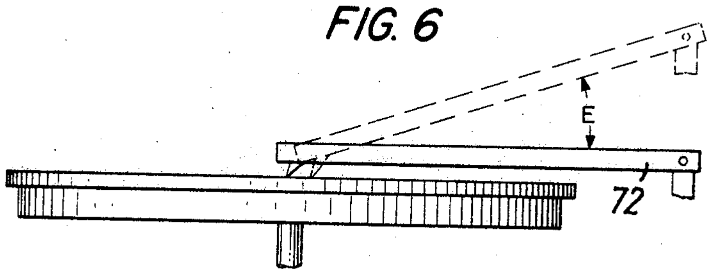
FIGURE 6 is a schematic view of a playback apparatus used in measuring the vertical tracking and modulation slant angles.

The test record is placed on a turntable in playback equipment, such as schematically illustrated in FIGURE 6, having an adjustable playback arm 72. The arm 72 is elevatable from its normal position, shown in solid lines, to an upper position, shown in dotted lines. The angle E, through which the arm is elevated is accurately predetermined. With the arm 72 in its normal position, the record is played in conventional manner with the playback stylus engaging each of the plurality of bands successively. In each band the second harmonic distortion is measured and the respective values plotted on a graph of second harmonic distortion vs. modulation velocity. These points will be found to fall generally on a straight line, as indicated in FIGURE 7 at (*a*).

The same procedure is repeated with the arm raised to its upper position through the angle E. As will be apparent, this will change the vertical tracking angle of the playback stylus. A second curve (*b*) may be plotted on the chart.

The arm 72 is then swung across the center of the record and the turntable run in the reverse direction to generate a second set of curves, one with the arm in its normal position and the other with the arm in its elevated position. The resultant plots are shown as curves (*c*) and (*d*) in FIGURE 7.

Figure 7:
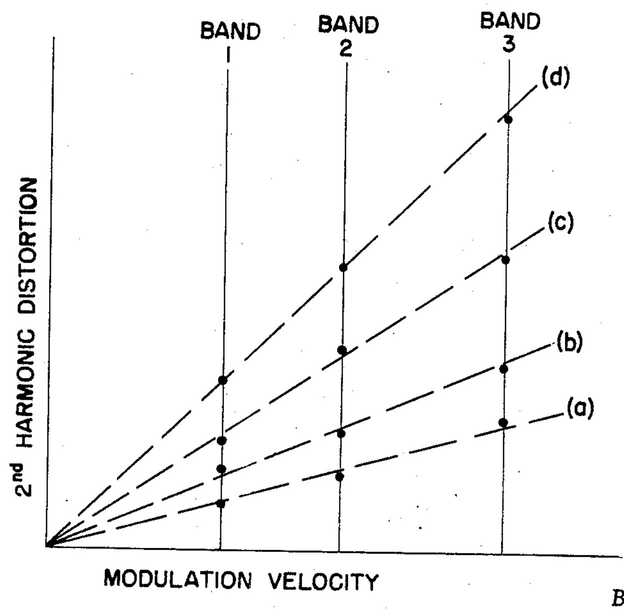
FIGURE 7 is a plot useful in computing the vertical tracking and modulation slant angles.

The slopes of the lines generated on the plot of FIGURE 7 are proportional to the amount of vertical mode distortion resulting from any difference between the vertical tracking angle of the playback stylus and the true modulation slant angle of the recorded modulation. Since the angle E through which the arm 72 is elevated adds a similar angle to the tracking angle of the stylus, the actual tracking angle with the arm in the normal position may be determined from the relative second harmonic distortion measured at any given modulation velocity. Moreover, since the plotted lines also depend upon the true modulation slant, the latter can be determined therefrom by geometrical analysis. Other techniques may, of course, be used to measure the angles.

As is apparent from the foregoing, the applicant has found a heretofore unknown cause of undesirable distortion in vertical modulation components and has discovered novel methods and apparatus for reducing this distortion to an unobjectionable level. The result is to substantially improve the quality of stereophonic recording to provide greater listener pleasure. To enable maximum benefit to be obtained from the novel methods and apparatus for overcoming the springback effect, various modifications in the recording styli have been devised. These variations, when used with the mounting apparatus disclosed and operated in accordance with the novel method, provide a substantial increase in overall record quality.

It will be readily apparent that various modifications in the methods and apparatus described herein may be deviced by those skilled in the art without departing from the spirit and scope of the invention and it is intended that the invention be limited only as set forth in the appended claims.

I claim:

1. In a method of cutting a phonograph record master used to produce duplicate records having a given modulation slant angle, the cutting stylus being mounted to provide a nominal vertical recording angle of substantially zero degrees, the steps of mounting the cutting stylus with its cutting tip oriented opposite to its normal position, rotating the record master opposite to its normal direction of rotation during the cutting operation, commencing the recording at an inner portion of the record and recording towards the outside, and applying the signals to be recorded to the cutting apparatus in reverse order, whereby the springback effect provided by the material of the record master and the cutting apparatus establishes the given modulation slant angle.

2. Apparatus for cutting a phonograph record master used to produce duplicate records having a given modulation slant angle, said record master having at least a recording surface of material exhibiting a springback effect upon relief of a stress applied thereto, comprising, a turntable for rotating said record master at a predetermined speed, a cutting stylus, means for mounting said stylus in cutting relationship to said recording surface, and means for establishing the vertical recording angle of said stylus at a value greater than said given modulation slant angle to compensate for said springback effect.

3. Apparatus according to claim 2 above wherein said means for establishing the vertical recording angle of said stylus includes wedge means having a wedge angle sufficient to compensate for said springback effect.

4. Apparatus for cutting a phonograph record master used to produce duplicate records having a given modulation slant angle, said record master having a recording surface of material exhibiting a springback effect upon relief of stress applied thereto, comprising, a turntable for rotating said record master at a predetermined speed, a cutting stylus, means for mounting said stylus in cutting relationship to said recording surface, said stylus and said mounting means also exhibiting a springback effect upon relief of stress applied thereto, and means in said mounting means for establishing the vertical recording angle of said stylus at an angle greater than said given modulation slant angle to compensate for said springback effects.

5. Apparatus for cutting a phonograph record master used to produce duplicate records having a given modulation slant angle, comprising, a turntable for rotating said record master at a predetermined speed, a cutting stylus, means for mounting said stylus in cutting relationship to said recording surface, said mounting means including a portion extending substantially parallel to the plane of the record master, signal responsive means in said mounting means for modifying the length of said portion of the mounting means in accordance with signals applied thereto, and means coupling the signals to be recorded to said signal responsive means, thereby to compensate for the variations in the modulation slant angle resulting from the stresses applied to said stylus and said record master during the recording process.

6. Apparatus according to claim 5 above, wherein said signal responsive means comprises a piezoelectric material.

7. Record cutting apparatus for cutting a groove in a recording surface comprising, a cutter supporting arm normally inclined at a predetermined angle to said recording surface, a stylus-receiving shank carried by said supporting arm, the axis of said shank being perpendicular to said arm, and a stylus having a cutting surface secured in said shank at an angle to said axis, said stylus and said shank being disposed to orient said cutting surface substantially perpendicularly to said recording surface during the cutting operation.

8. Record cutting apparatus for cutting a groove in a recording surface comprising, a cutter supporting arm normally inclined at a predetermined angle to said recording surface, a stylus-receiving shank carried by said supporting arm, said shank being generally perpendicular to said arm and having a portion bent at an angle to the axis of the shank, and a stylus having a cutting surface secured in said bent portion at the angle of the bend to the remaining portion of said shank.

9. Record cutting apparatus for cutting a groove in a recording surface comprising, a cutter supporting arm normally inclined at a predetermined angle to said recording surface, a stylus-receiving shank carried by said supporting arm at an angle thereto of other than 90°, and a stylus having a cutting surface secured in said shank and coaxially aligned therewith, said stylus and said shank being disposed to orient said cutting surface substantially perpendicularly to said recording surface during the cutting operation.

10. In apparatus including a recording element for translating signals onto a phonograph record wherein said signals are represented by a modulated signal track having a vertical component of modulation, and including means for moving said record continuously relative to said element, said record or copies of said record being adapted to be reproduced by a pickup element which tracks said signal track in said record or its copies, said pickup element having a certain vertical tracking angle, the improvement which comprises a support means for supporting said recording element at a vertical tilt angle nominally different from said vertical tracking angle but effectively the same as said vertical tracking angle, whereby to compensate for vertical tracking distortion of the signals upon translation by said pickup element.

11. Apparatus for recording on a record blank which moves continuously comprising (a) a cutting stylus movable into the surface of said record blank for cutting modulated grooves having a vertical component of modulation therein, and (b) means for relatively delaying and relatively advancing the movements of said stylus respectively, as said stylus cuts portions of said groove below and above a reference groove depth for compensating for vertical tracking angle error introduced by the elastic deflection of said record blank and said stylus in directions parallel to said direction of movement of said blank.

12. Apparatus for recording signals on a blank disc record to produce a record adapted to cooperate with a pickup having a predetermined vertical tracking angle comprising (a) a turntable for supporting and rotating said disc, (b) a stanchion adjacent said turntable, (c) a record cutterhead including (1) a stylus, (2) a bar pivotally supporting said stylus, and (3) means for producing movement of said bar in response to said signals, and (d) a wedge-shaped means attached to said cutterhead and attached to said stanchion for supporting said stylus on said stanchion at a predetermined vertical tilt angle with respect to said record, said tilt angle being nominally greater than said tracking angle.

13. Apparatus for cutting a phonograph record master used to produce duplicate records for reproduction with a playback means including a pickup stylus comprising, a turntable for rotating said record master at a predetermined speed, a cutting stylus, means for mounting said cutting stylus in cutting relationship to said recording surface to thereby produce a record groove, said mounting means including a portion extending substantially parallel to the plane of the record master, signal responsive means in said mounting means for modifying the length of said portion of the mounting means in accordance with signals applied thereto, a control signal source, and means coupling the output of said control signal source to said signal responisve means, thereby to compensate for distortion resulting from differences in geometry between said cutting apparatus and said playback means.

14. Apparatus for cutting a phonograph record master used to produce duplicate records for reproduction with a playback means including a pickup stylus comprising, a turntable for rotating said record master at a predetermined speed, a cutting stylus, means for mounting said cutting stylus in cutting relationship to said recording surface to thereby produce a record groove, first signal responsive means coupled to said mounting means for moving said cutting stylus laterally of said groove in accordance with signals applied thereto, second signal responsive means coupled to said mounting means for moving said cutting stylus longitudinally of said groove in accordance with signals applied thereto, and signal sources coupled to said first and second signal responsive means, whereby the longitudinal motion of said cutting stylus compensates for distortion resulting from differences in geometry between said cutting apparatus and said playback means.

References Cited

UNITED STATES PATENTS

| | | | |
|---|---|---|---|
| 2,962,561 | 11/1960 | Redlich et al. | |
| 3,176,085 | 3/1965 | Devries. | |
| 2,310,049 | 2/1943 | Albersheim | 274—46 |
| 3,019,020 | 1/1962 | Feinstein | 274—46 |
| 3,023,011 | 2/1962 | Wagner | 274—46 |
| 2,846,230 | 4/1958 | Richter | 274—42 |
| 3,035,840 | 1/1961 | Scott | 274—42 |

OTHER REFERENCES

E. R. Madsen: "Vertical Tracking Angle—A Source of IM Distortion," Audio Magazine, vol. 46, pp. 21–24, 88 and 89, November 1962.

H. E. Roys: "Force At the Stylus Tip While Cutting Lacquer Disk-Recording Blanks," Proceedings of the IRE, vol. 35, No. 11, November 1947.

NORTON ANSHER, Primary Examiner

JOSEPH F. PETERS, Jr., Assistant Examiner

U.S. Cl. X.R.

179—100.4; 274—38